United States Patent

[11] 3,572,753

| [72] | Inventor | Edmund H. Claassen |
| | | 1912 Grandview St., Medford, Oreg. 97501 |
| [21] | Appl. No. | 799,317 |
| [22] | Filed | Feb. 14, 1969 |
| [45] | Patented | Mar. 30, 1971 |

[54] FOLD-DOWN STEP FOR PICK-UP TRUCKS
8 Claims, 6 Drawing Figs.

[52] U.S. Cl. ................................................. 280/166
[51] Int. Cl. ................................................. B60r 3/02
[50] Field of Search.......................................... 280/166, 164; 105/448; 182/88

[56] References Cited
UNITED STATES PATENTS
| 1,180,215 | 4/1916 | Weiss ........................... | 280/166 |
| 1,471,972 | 10/1923 | Miller .......................... | 280/166 |
| 2,125,085 | 7/1938 | Pool ............................ | 280/166 |
| 3,095,216 | 6/1963 | Browne et al................. | 280/166 |

*Primary Examiner*—Kenneth H. Betts
*Assistant Examiner*—Robert R. Song
*Attorney*—Berman, Davidson and Berman

ABSTRACT: A step pivoted to the body of a pickup truck subjacent its door. The step is carried on a rod rotatably-mounted in a pivot sleeve. The rod has an arm connected by a cable to the door and by a spring to the truck body opposite the cable, to normally rotate the step to a retracted position beneath the truck body. Opening the door pulls the step to operative position.

PATENTED MAR 30 1971
3,572,753
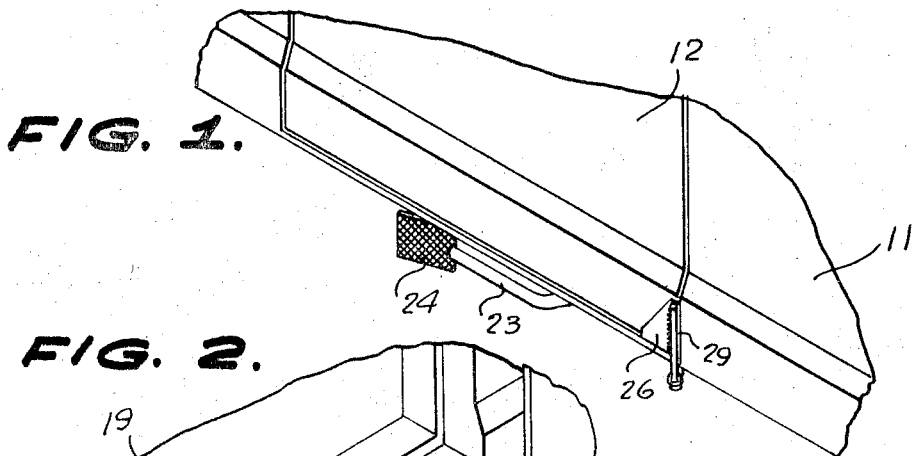
FIG. 1.
FIG. 2.
FIG. 6.
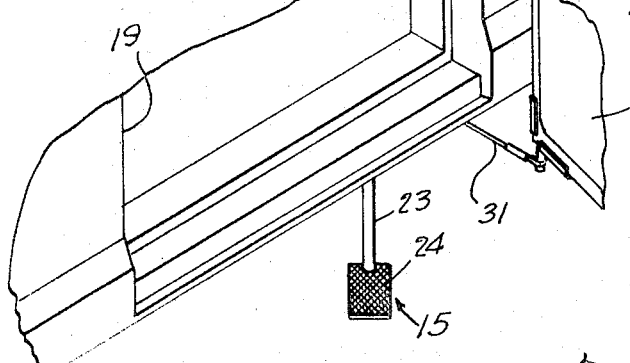
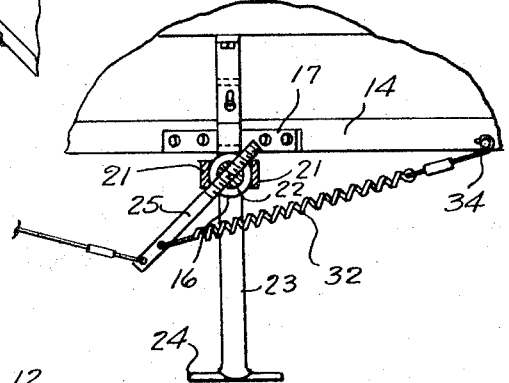
FIG. 3.
FIG. 4.
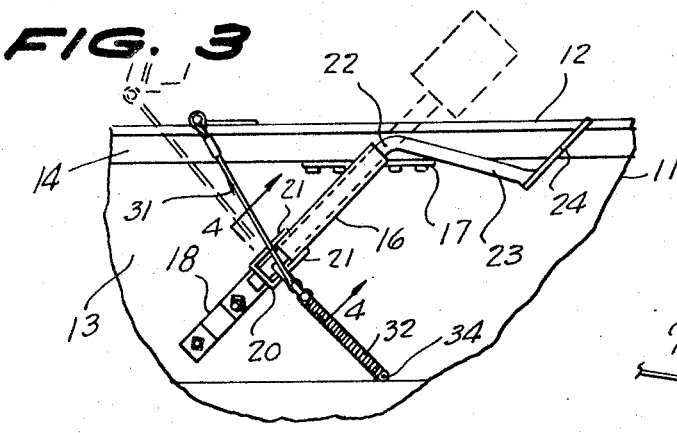
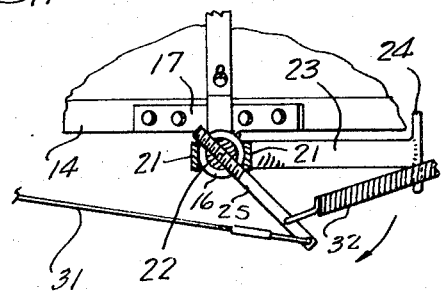
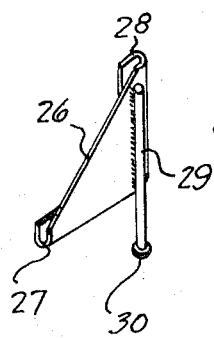
FIG. 5.
INVENTOR.
EDMUND H. CLAASSEN,
BY
*Berman, Davidson & Berman*
ATTORNEYS.

FOLD-DOWN STEP FOR PICK-UP TRUCKS

This invention relates to vehicle steps, and more particularly to retractable steps for motor vehicles.

The main object of the invention is to provide a novel and improved retractable step assembly for a motor vehicle, said assembly involving very simple parts, being easy to install, and greatly improving the safety and convenience of entering or leaving a motor vehicle, for example, a pickup truck, or similar vehicle.

A further object of the invention is to provide an improved retractable step assembly for a motor vehicle, said assembly involving relatively inexpensive components, being sturdy in construction, being reliable in operation, and being very compact in size.

A still further object of the invention is to provide an improved retractable step assembly for a pickup truck, or similar vehicle, the assembly including a retractable steplike support which is normally retracted beneath the body of the vehicle but which is swung into operative position responsive to the opening of an adjacent vehicle door, so that the step is automatically-swung into operative position when the door is opened, and is automatically-retracted to inoperative position when the door is closed.

Further objects and advantages of the invention will become apparent from the following description and claims, and from the accompanying drawing, wherein:

FIG. 1 is a perspective view of a fragmentary portion of the side of a pickup truck equipped with a retractable step assembly according to the present invention.

FIG. 2 is a perspective view of the structure of FIG. 1 with the truck door swung to open position, showing how the step assembly is thereby moved to operative position.

FIG. 3 is a bottom view of the structure of FIGS. 1 and 2.

FIG. 4 is a vertical cross-sectional view taken substantially on the line 4—4 of FIG. 3.

FIG. 5 is an enlarged perspective view of a cable anchor bracket assembly employed in the retractable step structure of FIGS. 1, 2 and 3.

FIG. 6 is a cross-sectional view similar to FIG. 4, but showing the positions of the parts when the door is in its open position.

Referring to the drawings, 11 generally designates the body of a motor vehicle, for example, a conventional pickup truck provided with a door 12 which is hinged to swing substantially on a vertical axis located adjacent the right margin of the door, as viewed in FIG. 1. The truck body 11 is conventional and includes the horizontal floor portion 13 and a longitudinal frame bar 14, as shown in FIG. 3. Designated generally at 15 is a retractable step assembly adapted to be installed on the truck body 11 in the region of the door 12 so that the step assembly can be used by a person entering or leaving the truck through the associated doorway.

The retractable step assembly comprises a horizontal pivot sleeve 16 which is secured subjacent the floor 13 so as to extend obliquely, as shown in FIG. 3. Thus, the sleeve 16 is rigidly-supported by a pair of brackets 17 and 18 secured to longitudinal frame bar 14 and the truck floor 13 so that the horizontal sleeve 16 has the oblique orientation shown in FIG. 3. Thus, the sleeve 16 may extend in a direction approximately 45° to the longitudinal frame bar 14.

As shown in FIG. 3, the sleeve 16 terminates subjacent the doorway, shown at 19, associated with the swingable door 12. Rigidly-secured to the opposite end portion of the sleeve 16 is a generally U-shaped bracket member 20 having the longitudinal side arms 21, 21 rigidly-secured longitudinally to the sleeve 16 so that the bight portion of the bracket 20 projects beyond the left end of sleeve 16, as viewed in FIG. 3, defining a loop. Journaled in the sleeve 16 is a swingable rod member 22 integrally-formed at its right end, as viewed in FIG. 3, with an outwardly-angled arm 23 to which is rigidly-secured a rectangular step pad 24. The opposite end portion of the rotatable rod 22 extends through an aperture provided therefor in the bight portion of the U-shaped bracket member 20, being rotatable therein. Threadedly-secured to the rod member 22 is an arm 25 which extends through the loop defined by the U-shaped member 20 and which is engageable with the side arms 21, 21 to limit the rotation of the rod member 22 to an angle of approximately 90°, for example, from the position thereof shown in FIG. 4 to the position thereof shown in FIG. 6. Because of its threaded engagement through the rod member 22, substantially diametrically thereof, as shown in FIGS. 4 and 6, the arm 25 is readily adjustable to provide a desired effective length thereof. As shown in FIGS. 4 and 6, the arm 25 preferably extends substantially perpendicular to the rod member 22.

Designated at 26 is a generally triangular bracket member formed with horizontal and vertical channeled end portions 27 and 28 shaped to receive the bottom and vertical edge portions of the door 12 at the lower left corner thereof, as viewed in FIG. 2, and to be rigidly-secured thereto. Thus, the bracket member 26 may be rigidly-secured to the lower right corner portion of the door 12, as viewed in FIG. 1, in any suitable manner as by welding, or the like. Welded, or otherwise rigidly-secured to the triangular bracket member 26 at the vertical margin thereof is a vertical depending anchor rod 29 formed with an enlarged bottom head portion 30. The end of the arm 25 is connected to the depending portion of the anchor rod 29 by a flexible cable 31, the length of the cable being such that when the door 12 is closed and the arm 25 engages the right-hand bracket arm 21, as viewed in FIG. 4, the cable 31 is substantially taut. The arm 25 is biased to the position of FIG. 4 by a coiled spring 32 connecting the arm 25 to the floor 13 opposite the cable 31, for example, to a pin or bolt 34, as shown in FIG. 3. Thus, the coiled spring 32 biases the arm 25 in counterclockwise direction, as viewed in FIG. 4. Thus, spring 32 biases the rod 22 also in a counterclockwise direction, namely, toward a position wherein the inclined arm 23 and the step pad 24 are retracted to a position beneath the floor 13 and longitudinal frame bar 14, as shown in full-line view in FIG. 3. When the door 12 is opened, the cable 31 exerts a pull on the arm 25, rotating it in a clockwise direction, as viewed in FIG. 4, for example, from the position of FIG. 4 to the position of FIG. 6, wherein it abuts the left side arm 21 of the bracket 20, against the tension of the coiled spring 32. The rotation of rod 22 in a clockwise direction from the position of FIG. 4 to the position of FIG. 6 rotates the arm 23 and the step pad 24 through an angle of approximately 90°, for example, from the position shown in full-line view in FIG. 3 to the position of FIG. 2, wherein the step pad 24 is positioned below the doorway 19 and is substantially horizontal, projecting forwardly from the doorway as shown in dotted view in FIG. 3. Thus, when the door 12 is swung to its open position, the step pad 24 is extended to an operative position spaced beneath and forwardly of the doorway 19 so that it can be employed by a person entering, or leaving, the truck body through the doorway 19. The weight of the person acting on the step pad 24 serves to hold the pad in its operative position against the biasing tension of the retracting spring 32. When the person's weight is no longer on the pad, the spring 32 acts to return the step pad 24 to its retracted full-line position of FIG. 3, and at the same time to close the door 12. The parts, therefore, tend to return to their normal positions, illustrated in FIG. 1, wherein the step pad 24 has been rotated to a vertical position and is substantially received beneath the floor 13 and frame bar 14.

It will be noted that since the arm 25 extends through the loop defined by the member 20, the loop cooperates with the arm 25 to limit longitudinal, as well as rotational movement of the step shaft rod 22.

It will be further noted that the step pad 24 extends substantially parallel to the step shaft rod 22 and thus, is inclined at an angle of approximately 45° to the longitudinal frame bar 14 when the pad 24 is in its normal retracted, inoperative position, shown in FIG. 3.

While a specific embodiment of an improved retractable step assembly for a motor vehicle, such as a pickup truck, or the like, has been disclosed in the foregoing description, it will be understood that various modifications within the spirit of the invention may occur to those skilled in the art. Therefore, it is intended that no limitations be placed on the invention except as defined by the scope of the appended claims.

I claim:

1. In a vehicle having a doorway and a door hinged in said doorway, a step member rotatably supported beneath said doorway so as to be swingable from a retracted position beneath the vehicle to an extended position projecting outwardly from and subjacent the doorway, means biasing said step member toward said retracted position, and means swinging the step member toward said extended outwardly projected position responsive to the opening of said door, wherein the means swinging the step member toward said extended position comprises a tension-transmitting member connecting the step member to the door, wherein the step member includes a horizontal supporting shaft rod and wherein obliquely oriented horizontal sleeve means is secured to the vehicle and rotatably receives said shaft rod.

2. The vehicle of claim 1, and an arm secured to said shaft rod and projecting at right angles thereto, said tension-transmitting member being connected to said arm.

3. The vehicle of claim 2, and wherein said biasing means comprises a coiled spring connected between the arm and the vehicle opposite said tension-transmitting member.

4. The vehicle of claim 3, and a loop element rigidly-secured to the inner end portion of said sleeve means, said arm extending through said loop element and being engageable with the side portions thereof to limit rotational and longitudinal movement of said shaft rod.

5. The vehicle of claim 4, and wherein the step member includes an outer inclined arm portion and the substantially flat step pad at the outer end of said inclined arm portion, said step pad being oriented so as to assume a substantially horizontal position projecting outwardly from and located adjacent the doorway when the door is open.

6. The vehicle of claim 5, and wherein said tension-transmitting member comprises a flexible cable element.

7. The vehicle of claim 6, and wherein the arm projecting at right angles to the shaft rod is threadedly-engaged therewith, whereby its effective length is adjustable.

8. The vehicle of claim 7, and wherein the engagement of said threadedly-secured arm with the side portions of said loop element limits the rotational movement of the shaft rod to substantially 90° of rotation.